(12) United States Patent
Tsai

(10) Patent No.: US 6,820,978 B1
(45) Date of Patent: Nov. 23, 2004

(54) EYEGLASSES HAVING EASILY MOUNTABLE TEMPLE UNIT

(76) Inventor: Chiang-Tung Tsai, No. 10-1, Lane 38, Chung-Yi 1st St., Jen-Te Hsiang, Tainan Hsien (TW)

( * ) Notice: Subject to any disclaimer, the term of this patent is extended or adjusted under 35 U.S.C. 154(b) by 0 days.

(21) Appl. No.: 10/644,480

(22) Filed: Aug. 20, 2003

(51) Int. Cl.[7] .................................................. G02C 1/04
(52) U.S. Cl. ......................... 351/103; 351/106; 351/109
(58) Field of Search ................................ 351/103–109, 351/41, 154

(56) References Cited

U.S. PATENT DOCUMENTS

| | | | | |
|---|---|---|---|---|
| 5,903,331 A | * | 5/1999 | Lin | 351/105 |
| 6,345,892 B2 | * | 2/2002 | Nakamura | 351/103 |

* cited by examiner

*Primary Examiner*—Huy Mai

(74) *Attorney, Agent, or Firm*—Law Offices of Kenneth C. Brooks

(57) ABSTRACT

A pair of eyeglasses includes a lens member formed with left and right retention holes respectively disposed adjacent to opposites sides thereof, and an arcuate groove that extends between the left and right retention holes, that is indented inwardly from a front face and that has two end portions. An elongated connecting member of a temple unit has two end segments extending respectively and rearwardly through the end portions of the groove, and an intermediate segment that is disposed within the groove and that interconnects the end segments. Temples are respectively pivoted to the end segments which are respectively formed with engaging tongues projecting frontwardly into and engaging the retention holes in the lens member.

3 Claims, 7 Drawing Sheets

EYEGLASSES HAVING EASILY MOUNTABLE TEMPLE UNIT

BACKGROUND OF THE INVENTION

1. Field of the Invention

The present invention relates to a pair of eyeglasses, more particularly to a pair of eyeglasses having an easily mountable temple unit.

2. Description of the Related Art

Referring to FIG. 1, a pair of known eyeglasses 1 is shown to include a one-piece lens member 11 and a temple unit 12. The lens member 11 includes a viewing part 111 that has opposite left and right sides and upper and lower ends, and that is formed with a mounting hole 114 adjacent to the upper end, and two mounting parts 112 extending rearwardly and respectively from the left and right sides of the viewing part 111. Each of the mounting parts 112 of the lens member 11 is formed with a retaining recess 113. The temple unit 12 includes a curved connecting member 120 and a pair of temples 13. The connecting member 120 includes two end segments 122,124 respectively abutting against the side parts 112 of the lens member 11, and an intermediate segment 121 that is disposed frontwardly of the viewing part 111, that interconnects the end segments 122,124, and that is formed with an engaging tongue 123 which projects rearwardly therefrom and which extends through the mounting hole 114 in the viewing part 11. The temples 13 are respectively pivoted to the end segments 122,124 of the connecting member 120 through two hinges 126, each of which is formed with a protrusion 127 that is inserted into the retaining recess 113 in a respective one of the mounting parts 112 of the lens member 11.

Mounting of the temple unit 12 on the lens member 11 is conducted by inserting the protrusions 127 of the hinges 126 into the recesses 113 in the end segments 122,124 of the lens member 11 and subsequently pulling and bending the intermediate segment 121 of the connecting member 120 to dispose the intermediate segment 121 in front of the viewing part 111 of the lens member 11 and to permit engagement between the tongue 123 and the mounting hole 114 in the viewing part 111.

The conventional eyeglasses 1 are disadvantageous in that mounting of the temple unit 12 on the lens member 11 is inconvenient.

SUMMARY OF THE INVENTION

Therefore, the object of this invention is to provide a pair of eyeglasses having a lens member and a temple unit that can be assembled to the lens member in a convenient manner so as to overcome the aforesaid disadvantage of the prior art.

According to the present invention, a pair of eyeglasses includes: a curved one-piece lens member having opposite front and rear faces, upper and lower ends, and opposite left and right sides interconnecting the upper and lower ends, the lens member being formed with an arcuate groove that extends between the left and right sides, that is disposed adjacent to the upper end, that is indented inwardly from the front face, and that has two opposite end portions, the lens member being further formed with left and right passages that are respectively disposed rearwardly and that are respectively aligned with the end portions of the arcuate groove, a left retention hole that is disposed between the left passage and the left side of the lens member, and a right retention hole that is disposed between the right passage and the right side of the lens member; and a temple unit including an elongated curved connecting member that has two end segments and an intermediate segment extending between and interconnecting the end segments, and a pair of temples respectively hinged to the end segments. Each of the end segments of the connecting member is formed with an engaging tongue that projects frontwardly therefrom. The end segments of the connecting member extend rearwardly through the end portions of the arcuate groove and the left and right passages in the lens member, respectively, so as to place the intermediate segment in the arcuate groove in the lens member. The engaging tongues of the end segments project frontwardly into and engage the retention holes in the lens member, respectively.

BRIEF DESCRIPTION OF THE DRAWINGS

Other features and advantages of this invention will become more apparent in the following detailed description of the preferred embodiment of this invention, with reference to the accompanying drawings, in which.

DETAILED DESCRIPTION OF THE PREFERRED EMBODIMENT

Figure 1:
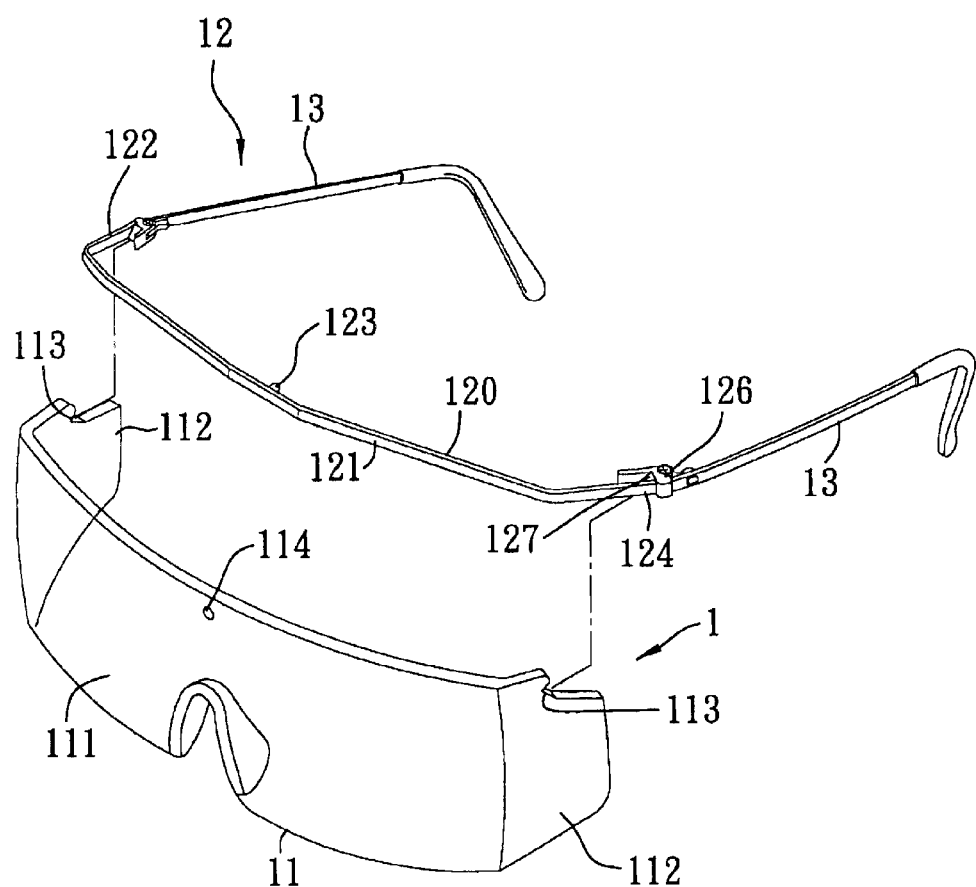
FIG. 1 is an exploded perspective view of a pair of known eyeglasses.
Figure 2:
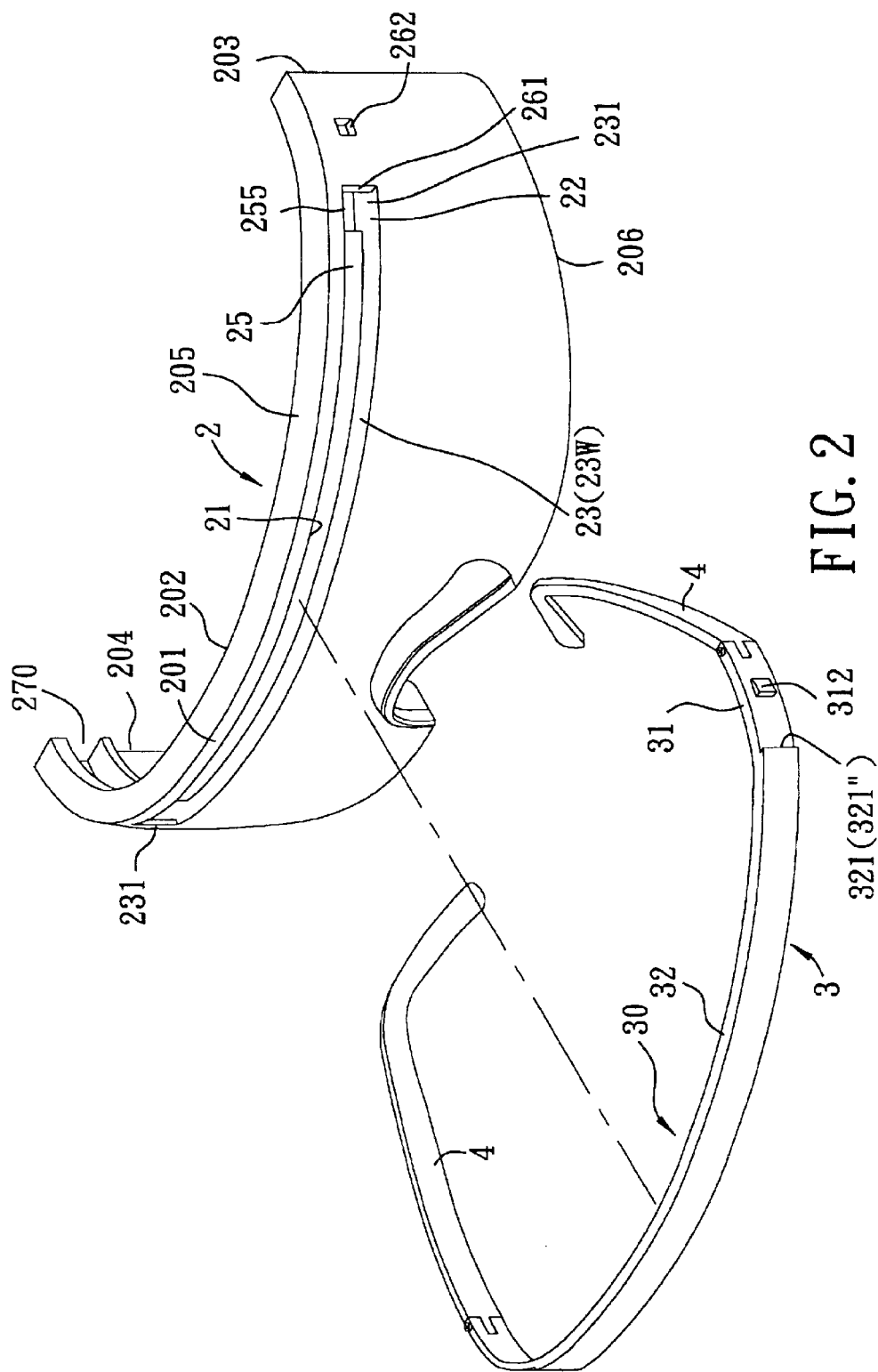
FIG. 2 is an exploded perspective view of the preferred embodiment of a pair of eyeglasses according to the present invention.
Figure 3:
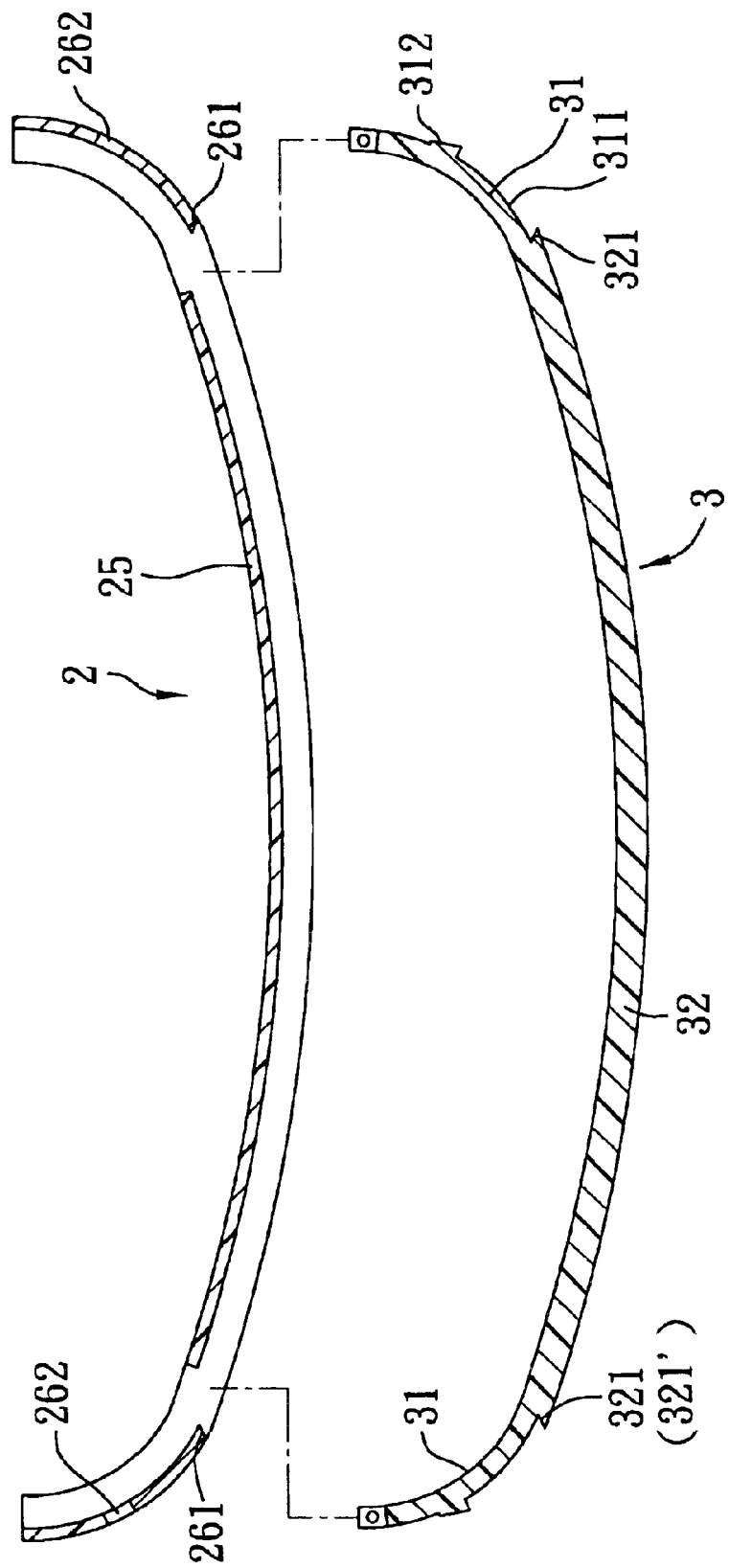
FIG. 3 is an exploded top planar view of the preferred embodiment.
Figure 4:
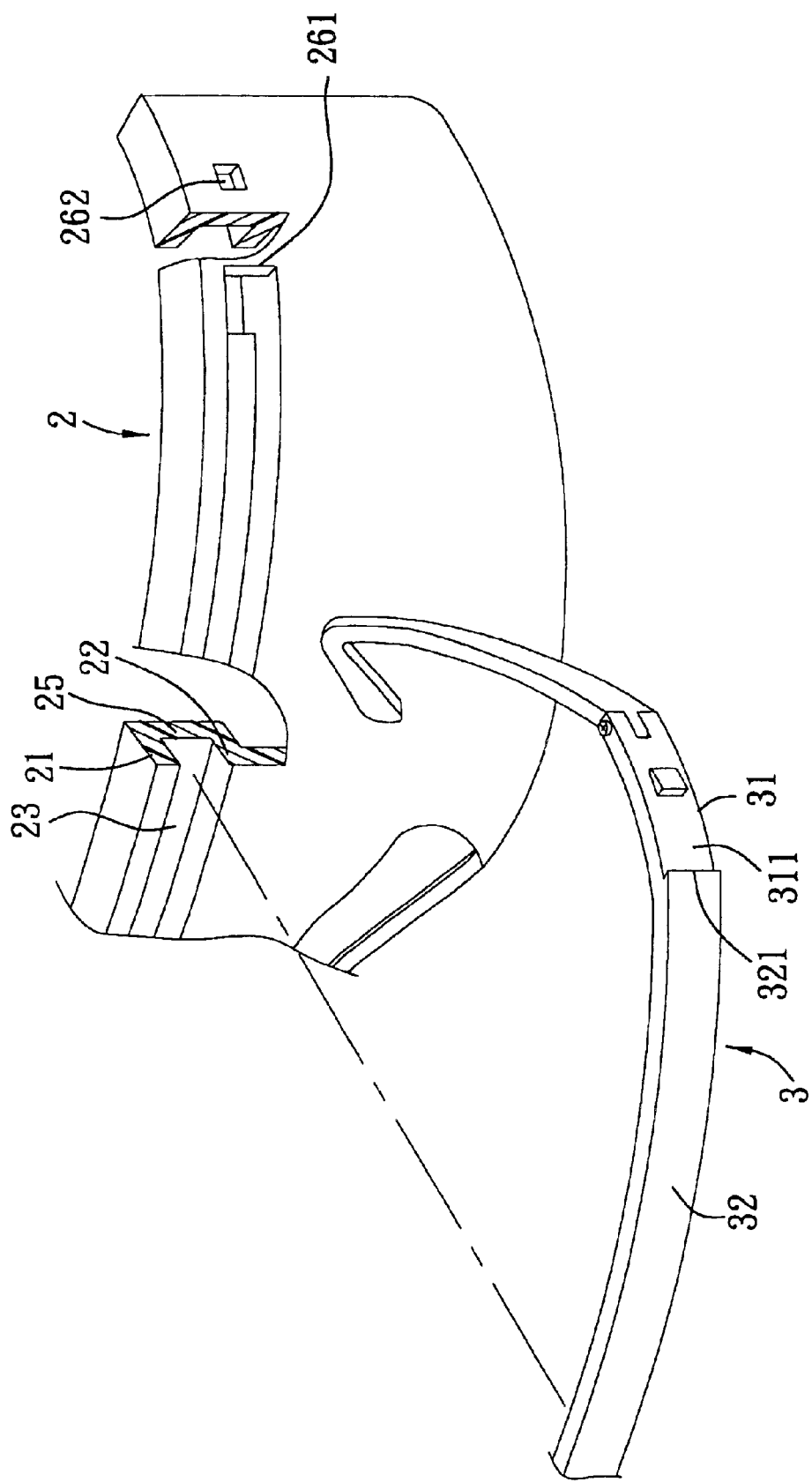
FIG. 4 is an exploded fragmentary partly sectional view of the preferred embodiment.

Referring to FIGS. 2 to 4, the preferred embodiment of a pair of eyeglasses according to the present invention is shown to include a curved one-piece lens member 2 and a temple unit 3.

As illustrated, the curved one-piece lens member 2 is made from plastic material, has opposite front and rear faces 201,202, upper and lower ends 205,206, and opposite left and right sides 203,204 interconnecting the upper and lower ends 205,206. The lens member 2 is formed with an arcuate groove 23 that extends between the left and right sides 203,204, that is disposed adjacent to the upper end 205, that is indented inwardly from the front face 201, and that has two opposite end portions 231. The lens member 2 is further formed with left and right passages 255 that are respectively disposed rearwardly and that are respectively aligned with the end portions 231 of the arcuate groove 23, a left retention hole 262 that is disposed between the left passage 255 and the left side 203 of the lens member 2, and a right retention hole 262 that is disposed between the right passage 255 and the right side 204 of the lens member 2. The lens member 2 is further formed with left and right retention grooves 270 that are indented inwardly from the rear face 202 of the lens member 2 and that are respectively in spatial communication with the end portions 231 of the arcuate groove 23 through the left and right passages 255.

The temple unit 3 includes an elongated curved connecting member 30 and a pair of temples 4. The curved connecting member 30 and the temples 4 can be made from metal or plastic material. The connecting member 30 has two end segments 31 and an intermediate segment 32 extending between and interconnecting the end segments 31. Each of the end segments 31 of the connecting member 30 has a front face 311, and is formed with an engaging tongue 312 that projects frontwardly from the front face 311 thereof.

The arcuate groove 23 in the lens member 2 is defined by a groove-defining wall 23W that includes left and right wall portions 261, upper and lower wall portions 21,22 interconnecting the left and right wall portions 261, respectively, and a rear wall portion 25 which interconnects the upper and lower wall portions 21,22, and which defines a rear side of the arcuate groove 23. In this preferred embodiment, each of the end segments 31 of the connecting member 30 has a thickness less than that of the intermediate segment 32 of the connecting member 30 so that each of the end segments 31 cooperates with the intermediate segment 32 to define a shoulder 321 therebetween. The shoulder 321 has an abutment face 321" that abuts against a respective one of the left and right wall portions 261 of the groove-defining wall 23W. In addition, the intermediate segment 32 of the connecting member 30 has a front face that is generally flush with the front face 201 of the lens member 2.

Figure 5:
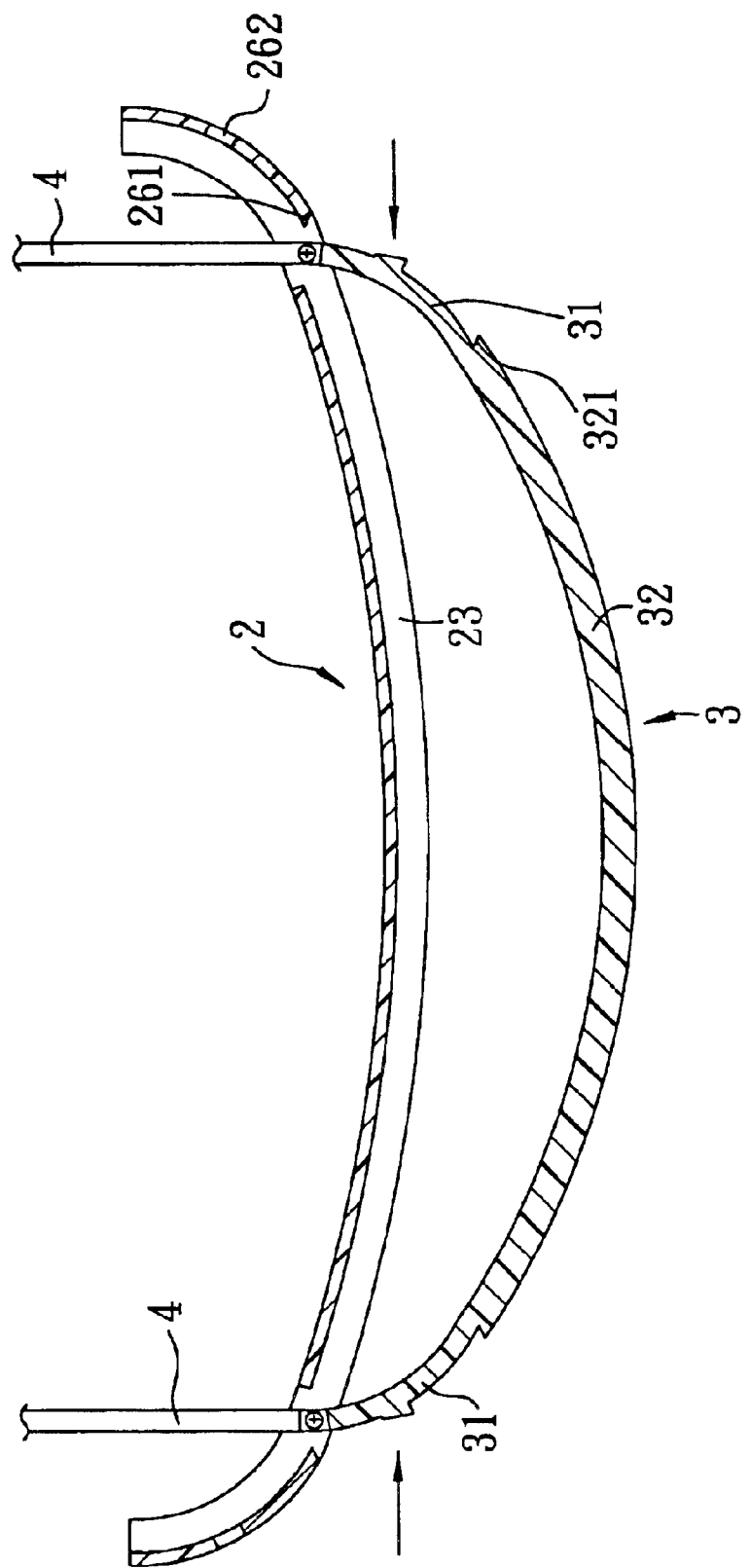
FIG. 5 is a fragmentary top planar view, illustrating how a temple unit is mounted onto a one-piece lens member of the preferred embodiment.
Figure 6:
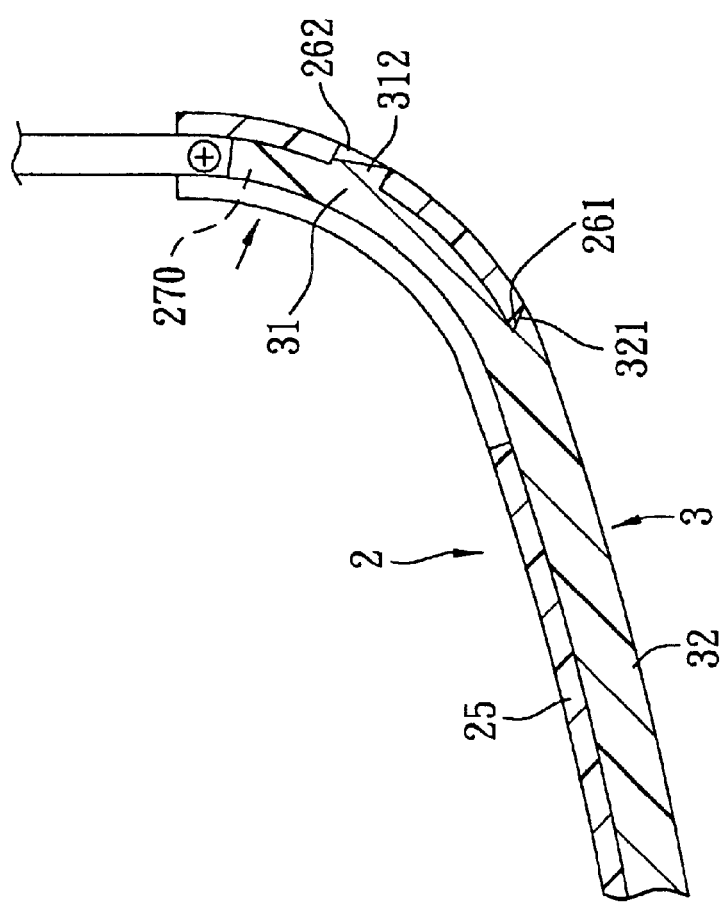
FIG. 6 is a fragmentary top planar view of the preferred embodiment.
Figure 7:
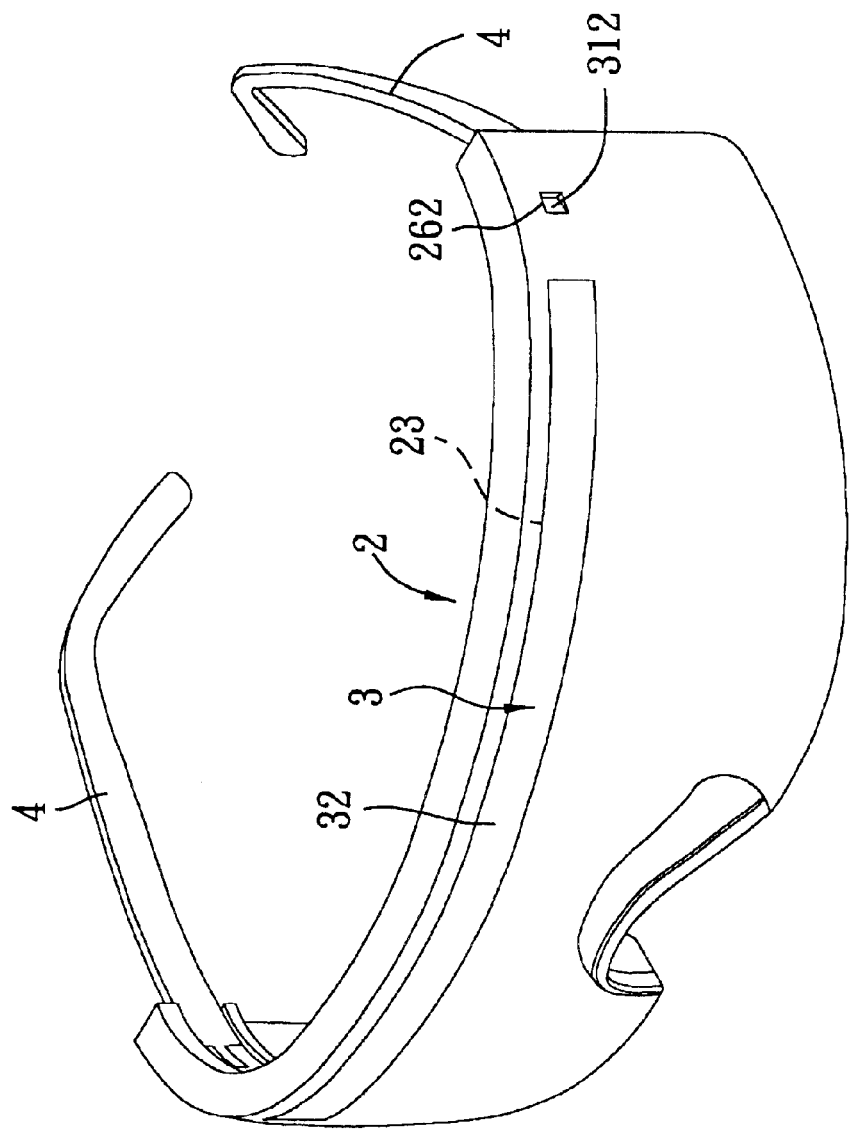
FIG. 7 is a perspective view of the preferred embodiment in an assembled state.

During assembly of the preferred embodiment, the temples 4 are respectively hinged to the end segments 31 of the connecting member 30. The end segments 31 of the connecting member 30 are resiliently deformed to move toward each other (see FIG. 5), and are extended together with the temples 4 rearwardly through the end portions 231 of the arcuate groove 23 and the left and right passages 255 in the lens member 2, respectively, so as to place the intermediate segment 32 in the arcuate groove 23 in the lens member 2 (see FIG. 7). The end segments 31 of the connecting member 30 are then restored to their its original shape so as to be received respectively in the left and right retention grooves 270 (see FIG. 6) in the lens member 2, thereby, resulting in press-fit engagement between the engaging tongues 312 of the end segments 31 and the retention holes 262 in the lens member 2, respectively. Thus, mounting of the temple unit 3 on the lens member 2 of the eyeglasses of this invention is easy to conduct as compared with the aforesaid conventional eyeglasses.

With this invention thus explained, it is apparent that numerous modifications and variations can be made without departing from the scope and spirit of this invention. It is therefore intended that the invention be limited only as indicated in the appended claims.

I claim:
1. A pair of eyeglasses comprising:
a curved one-piece lens member having opposite front and rear faces, upper and lower ends, and opposite left and right sides interconnecting said upper and lower ends, said lens member being formed with an arcuate groove that extends between said left and right sides, that is disposed adjacent to said upper end, that is indented inwardly from said front face, and that has two opposite end portions, said lens member being further formed with left and right passages that are respectively disposed rearwardly and are that respectively aligned with said end portions of said arcuate groove, a left retention hole that is disposed between said left passage and said left side of said lens member, and a right retention hole that is disposed between said right passage and said right side of said lens member; and
a temple unit including an elongated curved connecting member that has two end segments and an intermediate segment extending between and interconnecting said end segments, and a pair of temples respectively hinged to said end segments, each of said end segments of said connecting member being formed with an engaging tongues that projects frontwardly therefrom, said end segments of said connecting member extending rearwardly through said end portions of said arcuate groove and said left and right passages in said lens member, respectively, so as to place said intermediate segment in said arcuate groove in said lens member, said engaging tongues of said end segments projecting frontwardly into and engaging said retention holes in said lens member, respectively.

2. The eyeglasses as defined in claim 1, wherein said arcuate groove is defined by a groove-defining wall that includes left and right wall portions, upper and lower wall portions interconnecting said left and right wall portions, respectively, and a rear wall portion which interconnects said upper and lower wall portions, and which defines a rear side of said arcuate groove, each of said end segments of said connecting member having a thickness less than that of said intermediate segment of said connecting member such that a respective one of said end segments and said intermediate segment cooperatively define a shoulder therebetween, said shoulder having an abutment face that abuts against a respective one of said left and right wall portions of said groove-defining wall.

3. The eyeglasses as defined in claim 2, wherein said intermediate segment of said connecting member has a front face that is generally flush with said front face of said lens member.

* * * * *